United States Patent [19]

Asahara et al.

[11] Patent Number: 5,195,035
[45] Date of Patent: Mar. 16, 1993

[54] METHOD OF CONTROLLING AUTOMATIC TRANSMISSION WITH COMPENSATION FOR DELAY IN RESPONSE OF HYDRAULIC ACTUATION SYSTEM

[75] Inventors: Norimi Asahara, Toyota; Yasuo Hojo; Hideo Tomomatsu, both of Nagoya, all of Japan

[73] Assignee: Toyota Jidosha Kabushiki Kaisha, Aichi, Japan

[21] Appl. No.: 621,974

[22] Filed: Dec. 4, 1990

[30] Foreign Application Priority Data

Dec. 6, 1989 [JP] Japan .................. 1-317005

[51] Int. Cl.[5] ............................................. B60K 41/04
[52] U.S. Cl. .................... 364/424.1; 74/866; 74/867
[58] Field of Search ............. 364/424.1, 157, 164, 364/165, 177; 74/866, 867

[56] References Cited

U.S. PATENT DOCUMENTS

| | | | |
|---|---|---|---|
| 4,680,988 | 7/1987 | Mori | 74/866 |
| 4,699,025 | 10/1987 | Omitsu | 74/866 |
| 4,781,080 | 11/1988 | Iwatsuki | 74/867 |
| 4,792,902 | 12/1988 | Hrovat et al. | 364/424.1 |
| 4,821,190 | 4/1989 | Patil | 364/424.1 |
| 4,843,922 | 7/1989 | Kashihara | 74/866 |
| 4,855,914 | 8/1989 | Davis et al. | 364/424.1 |
| 4,875,391 | 10/1989 | Leising et al. | 74/866 |
| 4,956,776 | 9/1990 | Carre | 364/424.1 |
| 4,999,774 | 3/1991 | Tokoro et al. | 364/424.1 |
| 5,099,719 | 3/1992 | Hibi et al. | 74/866 |

FOREIGN PATENT DOCUMENTS

57-86650 5/1982 Japan .
60-201152 10/1985 Japan .

*Primary Examiner*—Parshotam S. Lall
*Assistant Examiner*—Collin W. Park
*Attorney, Agent, or Firm*—Oliff & Berridge

[57] ABSTRACT

In controlling an automatic transmission in a vehicle by a combination of an electronic computer system and a hydraulic actuation system according to a principle of feedback control so that the electronic computer system computes a target control state for the hydraulic actuation system and the hydraulic actuation system is operated according to a difference between the target control state and a current control state thereof, the difference is modified by an amount which is decreased along with lapse of time so that the delay in the operation of the hydraulic actuation system is compensated for by a simulation that at the start of control the difference is beforehand increased for an amount which is gradually cancelled by a delay function of the difference itself as the delay in the operation of the hydraulic actuation system disappears. The difference may further be modified so that the modification is started with a time lag. The difference may further be modified by the rate of change of itself.

11 Claims, 3 Drawing Sheets

METHOD OF CONTROLLING AUTOMATIC TRANSMISSION WITH COMPENSATION FOR DELAY IN RESPONSE OF HYDRAULIC ACTUATION SYSTEM

BACKGROUND OF THE INVENTION

1. Field of the Invention

The present invention relates to a control of an automatic transmission in a vehicle, and more particularly, to a control of a friction engaging means such as a clutch and a brake in the speed stage shifting of an automatic transmission by an electronic computer through a hydraulic actuation system.

2. Description of the Prior Art

It is already known in the art of automatic transmission in a vehicle having an assembly of gear wheels such as a planetary gear mechanism and friction engaging means such as clutches and brakes adapted to be selectively engaged or disengaged so as to set up various speed stages providing various reduction gear ratios in the automatic transmission to control said engagement and disengagement of the friction engaging means by a combination of an electric control means and a hydraulic actuation system, wherein said electric control means dispatches electric control signals for selective setting up of certain speed stages in the transmission, said electric control signals being supplied to one or more solenoid valves incorporated in said hydraulic actuation system so as to change over supply or exhaust of a hydraulic pressure to or from said friction engaging means, as disclosed in Japanese Patent Laid-open Publication 57-86650.

Further, in such an art of electro-hydraulic control of the automatic transmission in a vehicle it is also known to control supply or exhaust of a hydraulic pressure to or from certain friction engaging means in changing over of speed stages of the transmission under watching of the rotational speed of a rotation member such as a drum of a clutch incorporated in the gear train so that the supply or exhaust of the hydraulic pressure to or from such certain friction engaging means is controlled on a real time basis according to each instant difference between the rotational speed of said rotation member and a certain target value therefor computed by an electronic computer based upon data with regard to various operation parameters of the vehicle in a manner of feedback control cyclically repeated at a certain time interval such as several microseconds, as disclosed in Japanese Patent Laid-open Publication 60-201152.

However, in such a combination of an electronic computer system and a hydraulic actuation system there is a great difference between the speeds of operation of the two systems. The electronic computer can finish almost all control calculations at an instant, whereas the hydraulic actuation system needs a substantial time to accomplish certain control operations due to a hydraulic inertia which generally causes a relatively large delay in response to an increase or decrease of the cross sectional area of a flow passage allowed for the hydraulic fluid. Therefore, if, for example, the electronic computer system generates a control output signal to change over the transmission from a certain first speed stage to a certain second speed stage at a certain moment to, as shown in FIG. 1, the hydraulic pressure in a clutch or a brake which is newly supplied with the hydraulic pressure for setting up said certain second gear stage is delayed as shown in FIG. 1, wherein the delay includes a time lag Tg which lapses before the hydraulic pressure starts to increase and an asymptotic delay Tf such as a first order delay, a second order delay or a further order delay during which the hydraulic pressure gradually increases so as asymptotically to approach the final value thereof.

In the electro-hydraulic control of the automatic transmission in a vehicle the electronic control system generally provides its output control signal in the form of a series of electric pulses to be supplied to a solenoid valve in the hydraulic actuation system, said pulse signal having a duty ratio representing the instructions to be given to the hydraulic actuation system. If the electronic computer system operates to produce an output signal such as said pulse signal having a variable duty ratio based upon only such input data as throttle opening of the engine determined by stepping on an accelerator pedal by the driver, patterns of driving such as the economy pattern putting preference on the economical performance of the vehicle and the power pattern putting preference on the power performance of the vehicle selected at a pattern select switch operated by the driver, and shift positions such as the R, N, D, 2 and L set up by a manual lever handled by the driver, the delay in response of the hydraulic actuation system as shown in FIG. 1 would cause no substantial problem. However, if the control computation in the electronic computer system also refers to such data as vehicle speed, oil temperature in the engine, rotational speed of a certain rotation member so as to modify the curve of asymptotic approach of the hydraulic pressure to its target value for a better speed stage shifting performance of the automatic transmission, the delay in the hydraulic actuation system seriously affects the performance of the automatic transmission control as the vehicle speed and the rotational speed of said certain rotation member are directly affected by such delay in the operation of the hydraulic actuation system thereby substantially disturbing the feedback gain. Therefore, certain measures are required to deal with such delays in the hydraulic actuation system if high performance of the automatic transmission is to be ensured based upon wide variety of operation parameters having more or less influence on the operation of the automatic transmission.

SUMMARY OF THE INVENTION

Therefore, it is a primary object of the present invention to deal with the delay in the operation of a hydraulic actuation system in a combination of a hydraulic actuation system and an electronic computer system for a control of an automatic transmission in a vehicle so that said delay in the operation of the hydraulic actuation system is compensated for by a delay means which simulates said delay in the operation of the hydraulic actuation system.

Further, in view of the fact that the delay in the hydraulic actuation system relative to the electronic computer system in the automatic transmission control includes a time lag and an asymptotic delay such as a first order delay, a second order delay or further order delay, it is a further object of the present invention to deal with said delay in the operation of the hydraulic actuation system so that said delay in the operation of the hydraulic actuation system is compensated for by a combination of an asymptotic delay means and a time lag means.

Further, in consideration that the delay in the operation of the hydraulic actuation system in the automatic transmission in a vehicle will include a dynamic component which reflects the rate of change of a control input to the hydraulic actuation system thereon, it is a further object of the present invention to deal with said delay in the operation of the hydraulic actuation system so that said delay in the operation of the hydraulic actuation system is compensated for according to the rate of change of a control input to the hydraulic actuation system.

In order to accomplish these and other objects the present invention proposes a method of controlling an automatic transmission in a vehicle by a combination of an electronic computer system and a hydraulic actuation system according to a principle of feedback control so that said electronic computer system computes a target control state for said hydraulic actuation system and said hydraulic actuation system is operated according to a difference between said target control state and a current control state thereof, wherein said difference is modified by an amount which is decreased along with a lapse of time so as to compensate for a delay in operation of said hydraulic actuation system relative to operation of said electronic computer system.

In the above-mentioned method, said amount may be asymptotically decreased along with the lapse of time.

Further, in the above-mentioned method, said amount may be decreased starting after the lapse of a predetermined time from the start of control.

Further, in the above-mentioned method, said control may be a cyclic control based upon cyclic picking up of data, computation of an instant value of said target control state based upon instant values of said data, and computation of an instant value of said difference, and said difference is modified based upon a comparison of successive ones of such instant values.

Further, in the above-mentioned method, said control may be a cyclic control based upon cyclic picking up of data, computation of an instant value of said target control state based upon instant values of said data, and computation of an instant value of said difference, and said difference is further modified so that at least one of said instant values of said difference in the past is added thereto or subtracted therefrom with multiplication of a proportion factor.

Further, in the above-mentioned method, said delay in said modification of said difference may be effected by going back to a plurality of older ones of said instant values of said difference with multiplication of respective dividing factors for obtaining said asymptotic function of said difference.

BRIEF DESCRIPTION OF THE DRAWINGS

In the accompanying drawings.

DESCRIPTION OF THE PREFERRED EMBODIMENTS

In the following the present invention will be described in more detail with respect to some preferred embodiments with reference to the accompanying drawings.

Figure 2:
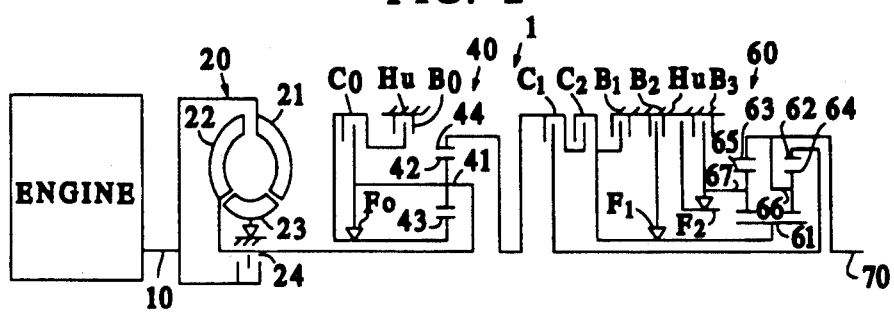
FIG. 2 is a diagrammatical illustration of an automatic transmission in a vehicle having a torque converter and a gear train including planetary gear assemblies and friction engaging means.

Referring to FIG. 2 illustrating diagrammatically an automatic transmission in a vehicle to which the transmission control method according to the present invention may be applied, the transmission generally designated by reference numeral 1 comprises a torque converter 20 of a conventional type having a pump 21 connected with an engine via an input shaft 10, a turbine 22 and a stator 23, a lock-up clutch 24 for selectively directly connecting the pump 21 with the turbine 22, a first gear unit 40 including a planetary gear mechanism having a sun gear 43, a ring gear 44, a planetary pinion 42 and a carrier 41 connected with the turbine 22 of the torque converter 20, a clutch Co for selectively connecting the sun gear 43 with the carrier 41, a brake Bo for selectively braking the sun gear 43 relative to a housing Hu and a one way clutch Fo for torque transmittingly connecting the sun gear 43 with the carrier 41 only in one rotational direction, and a second gear unit 60 including a first planetary gear mechanism having a sun gear 61, a ring gear 62, a planetary pinion 64 and a carrier 66, a second planetary gear mechanism having a sun gear 61 in common with the sun gear 61 of the first planetary gear mechanism, a ring gear 63, a planetary pinion 65 and a carrier 67, a clutch $C_1$ for selectively connecting the ring gear 62 with the ring gear 44 of the first gear unit 40, a clutch $C_2$ for selectively connecting the sun gears 61 with the ring gear 44 of the first gear unit 40, a brake $B_1$ for selectively braking the sun gears 61 relative to the housing Hu, a series combination of a brake $B_2$ and a one way clutch $F_1$ for selectively braking the sun gears 61 only in one rotational direction when the brake $B_2$ is engaged, a brake $B_3$ for selectively braking the carrier 67 relative to the housing Hu, and a one way clutch $F_2$ for braking the carrier 67 relative to the housing Hu only in one rotational direction, wherein the carrier 66 and the ring gear 63 are connected with one another and with an output shaft 70 of the transmission.

Figure 3:
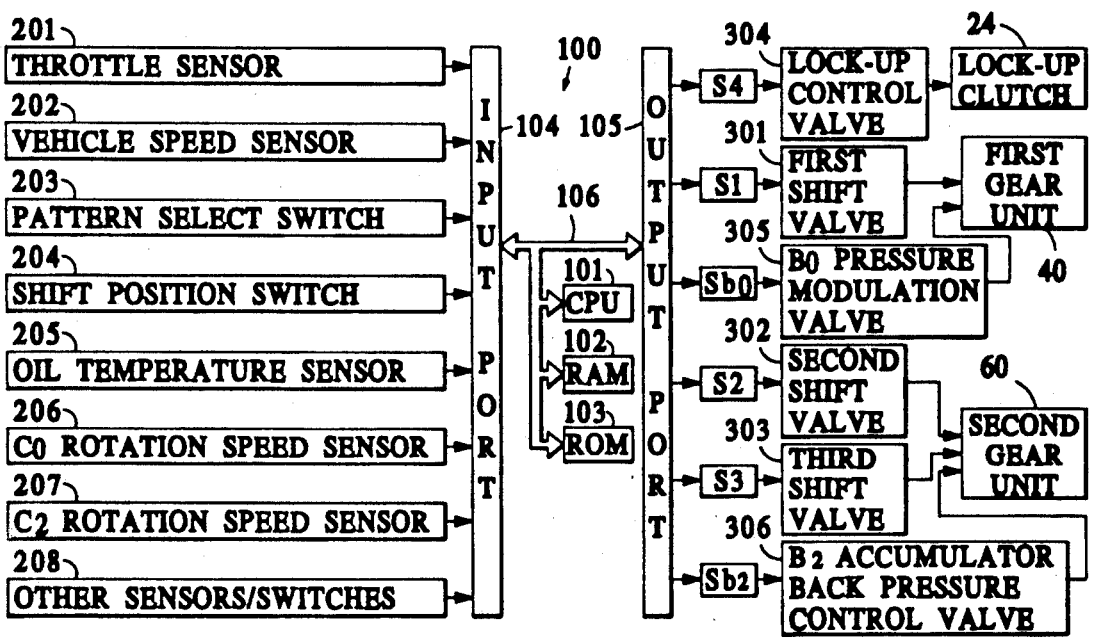
FIG. 3 is a diagrammatical illustration of a control system for changing over the gear train shown in FIG. 1 for various speed stages.

The clutches $C_0$, $C_1$ and $C_2$ and the brakes $B_0$, $B_1$, $B_2$ and $B_3$ may be hydraulically operated to be engaged or disengaged by a electro-hydraulic control system the general concept of which is well known in the art in such a manner that solenoid-operated change-over valves change over supply and exhaust of hydraulic pressure to and from the respective clutches and brakes under the control of an electronic computer. FIG. 3 shows such an electro-hydraulic control system in a diagrammatical illustration.

Such a tandem connection of the first gear unit 40 and the second gear unit 60 can be controlled according to the conventional method to provide four forward speed stages by the second gear unit 60 being changed over between three different gear ratios while the first gear unit 40 is maintained in its lower gear stage so that the 1st, 2nd and 3rd speed stages are provided, and then by the first gear unit 40 being changed over to its higher gear stage while the second gear unit 60 is maintained at the 3rd speed stage so that the 4th speed stage is provided as an overdrive stage. (Of course a reverse stage is also provided, as well known in the art.) However, the tandem connection of the first gear unit 40 and the second gear unit 60 shown in FIG. 2 is herein controlled by the electro-hydraulic control unit shown in FIG. 3 so as to provide six forward speed stages by on and off combinations of the clutches $C_0$–$C_2$, the brakes $B_0$–$B_3$ and the one way clutches $F_1$–$F_2$ as shown in Table 1:

TABLE 1

| Range | Speed | $C_0$ | $B_0$ | $C_1$ | $C_2$ | $B_1$ | $B_2$ | $B_3$ | $F_0$ | $F_1$ | $F_2$ |
|---|---|---|---|---|---|---|---|---|---|---|---|
| R | — | o |   |   | o |   |   | o | o |   |   |
| D | 1st | o |   | o |   |   |   |   | o |   | o |
| D | 2nd | o | o | o |   |   |   |   |   |   | o |
| D | 3rd | o |   | o |   |   | o |   | o | o |   |
| D | 4th |   | o | o |   |   | o |   |   | o |   |
| D | 5th | o |   | o | o |   | o |   |   |   |   |
| D | 6th |   | o | o | o |   | o |   |   |   |   |
| 2 | 1st | o |   | o |   |   |   |   | o |   | o |
| 2 | 2nd |   | o | o |   |   |   | o |   |   | o |
| L | 1st | o |   | o |   |   |   | o | o |   |   |

In the above table, "o" indicates that the clutch, brake or one way clutch is engaged at the corresponding speed stage under the corresponding shift range.

Referring to FIG. 3, the electro-hydraulic control system comprises an electronic control system principally constructed by an electronic computer unit 100 which is now available in various standards in the art as a hardware generally including a central processing unit (CPU) 101, a random access memory (RAM) 102, a read only memory (ROM) 103, an input port means 104, an output port means 105 and a common bus means 106 interconnecting these components The electronic computer unit 100 is supplied with various data through the input port means 104 such as throttle opening from a throttle sensor 201, vehicle speed from a vehicle speed sensor 202, patterns of driving such as the economy pattern putting preference on the economical performance of the vehicle and the power pattern putting preference on the power performance of the vehicle from a pattern select switch 203, shift positions such as the R, N, D, 2 and L set by a manual lever from a shift position switch 204, oil temperature from an oil temperature sensor 205, rotational speed of an outer drum of the clutch Co from a $C_0$ rotation speed sensor 206, rotational speed of an outer drum of the clutch $C_2$ from a $C_2$ rotation speed sensor 207 and other data from other sensors and/or switches or the like generally designated by 208.

In the electronic computer unit 100, the CPU 101 conducts certain calculations including those described in detail hereinunder particularly according to the present invention based upon the data received from said sensors and/or switches and the programs stored in the ROM 103 in cooperation of the RAM 102, and outputs control signals to a hydraulic control means including various standard components not shown in the figure and particularly the following components:

$S_1$ is a solenoid valve which controls, according to on and off thereof, changing-over of a first shift valve 301 which controls supply and exhaust of oil pressure to and from the clutch $C_0$ and the brake $B_0$ of the first gear unit 40.

$S_2$ and $S_3$ are solenoid valves which control, according to on and off thereof, changing-over of a second shift valve 302 and a third shift valve 303 which control supply and exhaust of oil pressure to and from the clutches $C_1$ and $C_2$ and the brakes $B_1$, $B_2$ and $B_3$ of the second gear unit 60.

$S_4$ is a solenoid valve which controls, according to on and off thereof, change-over of a lock-up control valve 304 which controls supply and exhaust of oil pressure to and from the lock-up clutch 24.

$Sb_0$ is a solenoid valve which controls, according to periodic on and off thereof, an opening of a $B_0$ pressure modulation valve 305 which controls oil pressure in the brake $B_0$ so that the pressure in the brake $B_0$ is continually changed according to the duty ratio of the on and off of the solenoid valve $Sb_0$.

$Sb_2$ is solenoid valve which controls, according to periodic on and off thereof, an opening of a $B_2$ accumulator back pressure control valve 306 which controls back pressure in an accumulator for the brake $B_2$ so that the speed of progress of engagement or disengagement of the brake $B_2$ is continually changed according to the duty ratio of the on and off of the solenoid valve $Sb_2$.

The method of control of the automatic transmission according to the present invention will be described with respect to upshifting the transmission from the 2nd speed stage to the 3rd speed stage during which, in the first gear unit 40 the brake $B_0$ is disengaged while the clutch $C_0$ is engaged so that it is changed over from its higher gear stage to its lower gear stage, and in the second gear unit 60 the brake $B_2$ is newly engaged so that it is changed over from its second gear stage to its third gear stage, resulting in an upshifting of the transmission as a whole.

The art of gradually exhausting oil pressure from the brake $B_0$ (in fact a hydraulic chamber thereof) in exchange with gradually supplying oil pressure to the clutch $C_0$ (in fact also a hydraulic chamber thereof) is generally well known. In this connection, it is also well known to relate the timing of such exhaust of oil pressure with the timing of such supply of oil pressure. Similarly, the art of gradually supplying oil pressure to the brake $B_2$ is also well known.

Such an upshifting from the 2nd speed stage to the 3rd speed stage is decided by the electronic computer unit 100 by certain calculations conducted therein according to a program stored in the ROM 103 based upon the data received from the throttle sensor 201, etc. and when it was decided as a result of the calculations that the transmission is shifted up from the 2nd speed stage to the 3rd speed stage, the electronic computer unit 100 supplies a first electric signal to the solenoid valve $S_1$ so as to switch over the first shift valve 301 thereby to switch over supply of the hydraulic pressure from the brake $B_0$ to the clutch $C_0$, a second electric signal to the solenoid valve $S_2$ so as to switch over the second shift valve 302 thereby to newly supply the hydraulic pressure to the brake $B_2$, a third electric signal to the solenoid valve $Sb_0$ thereby to control the $B_0$ pressure modulation valve 305 so as to modify the hydraulic pressure in the brake $B_0$ in the course of exhaustion thereof, and a fourth electric signal to the solenoid valve $Sb_2$ so as to control the $B_2$ accumulator back pressure control valve 306 thereby to modify the hydraulic pressure in the brake $B_2$.

Figure 4:
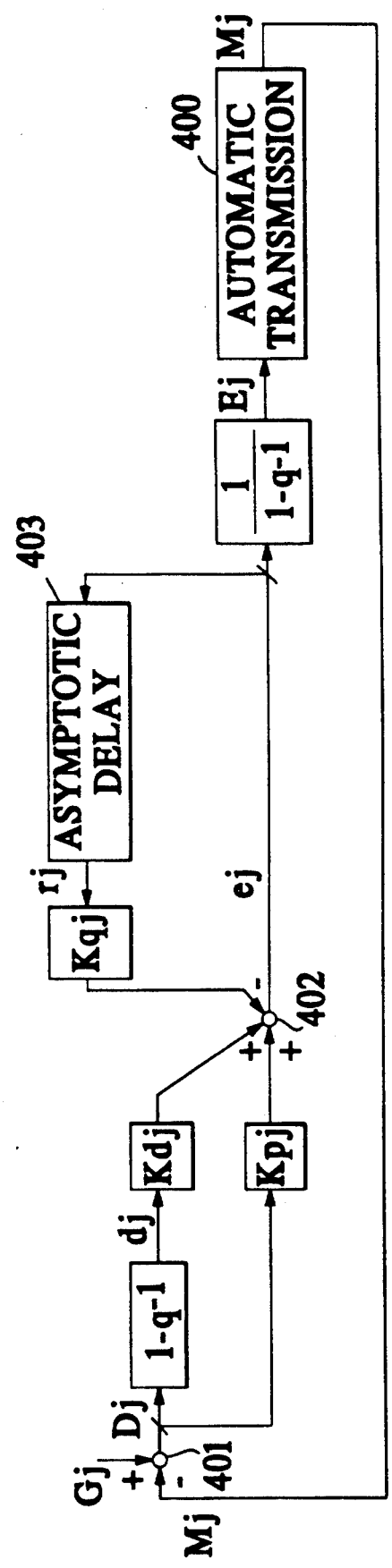
FIG. 4 is a diagrammatical illustration in the form of a control circuit of a first embodiment of the method of controlling an automatic transmission according to the present invention.

In FIG. 4, the control according to a first embodiment of the present invention is shown in its essential portions. Control parameters which are convenient to monitor the progress of changing-over control of the first gear unit 40 and the second gear unit 60 such as the rotational speeds of the clutch $C_0$ and $C_2$ are shown by Mj (j=1, 2, 3, ...), which can be processed by a common control circuit such as shown in FIG. 3 because the control system herein shown is a digital control system which operates based upon digital signals processed in succession, and therefore it can handle a plurality of parallel control systems as parallelly proceeded. The automatic transmission 400 provides output state signals Mj, while the electronic computer unit 100 provides control signals Gj corresponding to the control parameters Mj. In the control circuit, the differences Dj between the control signals Gj and the output states signals Mj are determined at an adder 401, and the differences Dj are processed by an operator "$1-q^{-1}$", wherein $q^{-1}$ is a sampling delay operator which picks up data obtained at a data sampling process preceding by one cycle to the current data sampling process. Thus deviations dj of the current values of Dj from those at the preceding cycle are obtained.

The differences Dj are multiplied by factors Kpj, while the deviations dj are multiplied by factors Kdj, and the two outcomes are added at an adder 402 with one another and have subtracted therefrom delay compensation amounts Kqj.rj, described hereinunder, to generate control deviations ej, which are then processed by an operator "$1/1-q^{-1}$" so that the control deviations ej are re-converted to control amounts Ej which are supplied to the automatic transmission 400 as control inputs therefor.

In order to compensate for the delay in the operation of the hydraulic actuation system the signals ej are processed by an operator 403 which provides an asymptotic correction such as a first order delay, a second order delay or further order delay to its input. The outputs rj of the operator 403 are multiplied by factors Kqj to provide compensation amounts which are added, as described above, with Kpj.Dj and Kdj.dj at the adder 402 so that the control deviations ej may be provisionally increased for certain amounts in an early stage of control to compensate for the delay in the operation of the hydraulic actuation system but such certain amounts for compensation are gradually cancelled as the delay in the operation of the hydraulic actuation system is caught up. By appropriately setting up the performance of the asymptotic delay function of the operator 403, the overall gain of the feedback control for the automatic transmission 400 is optimized throughout the entire operational period thereof so that high transmission shifting performance is available.

Figure 1:
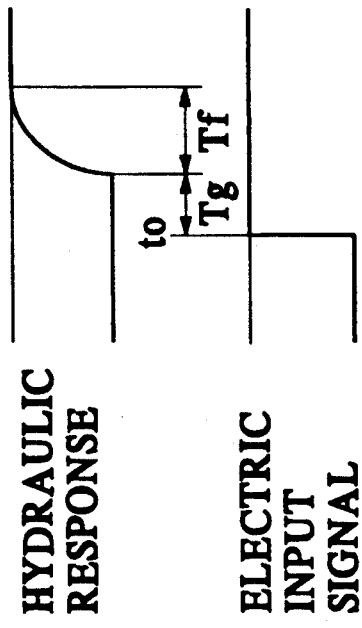
FIG. 1 is a diagram illustrating a delay in the operation of the hydraulic actuation system relative to the electronic computer system.
Figure 5:
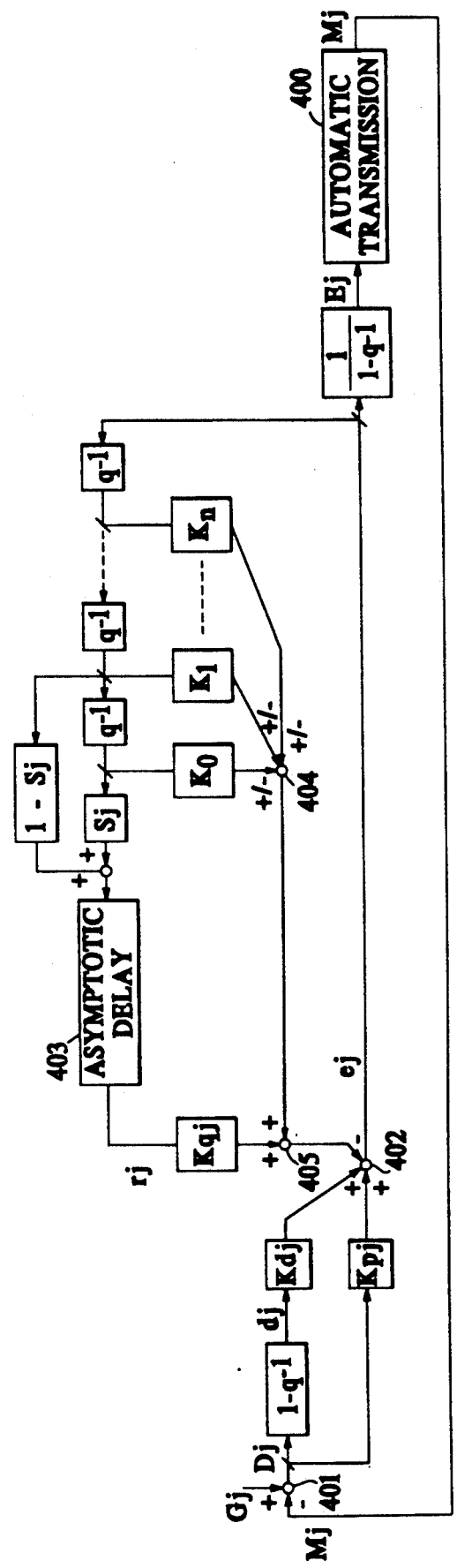
FIG. 5 is a diagrammatical illustration similar to FIG. 4 showing a second embodiment of the present invention.

FIG. 5 is a diagram similar to FIG. 4 showing a second embodiment of the present invention. In FIG. 5 the portions corresponding to those shown in FIG. 4 operate in the same manner as in FIG. 4. In this embodiment, the control deviations ej are processed partly through two $q^{-1}$ operators in succession and partly through three $q^{-1}$ operators in succession in parallel with one another and through the asymptotic delay function operator 403 for generating the compensation amounts rj. Herein, provided that suffix "n" in "Kn" is "2", factors Sj and $1-Sj$ are the weighing factors for appropriately positioning the values of the control deviations ej between the values thereof in the past by two cycles and the value thereof in the past by three cycles. This process is more useful in compensating for the time lag like Tg in FIG. 1. The number of the $q^{-1}$ operators to be used in combination with factors $K_0, K_1, \ldots K_n$ as weighed by weighing factors such as Sj are of course not limited to three as shown in FIG. 5, as suggested by "Kn".

In the control circuit of FIG. 5 the control deviations ej are further processed in parallel with the asymptotic delay function operator as partly and gradually more processed by the $q^{-1}$ operator and multiplied by factors $K_0, K_1, \ldots K_n$, such parts being added normally or subtracted (i.e. +or−) with one another at an adder 404 to produce modification amounts which are added with the amounts processed through the asymptotic delay operator 403 at an adder 405 so as finally to produce the compensation amounts to be negatively added with Kdj.dj and Kpj.Dj at the adder 402. This process provides an availability of compensating for the delay in the operation of the hydraulic actuation system according to the rate of change of the control amount so that the dynamic performance of the automatic transmission in the speed stage shifting is reflected upon in the control thereof.

Although the invention has been described in detail with respect to some preferred embodiments thereof, it will be apparent to those skilled in the art that various modifications are possible without departing from the scope of the present invention.

We claim:

1. A method of controlling an automatic transmission in a vehicle using a combination of an electronic computer system and a hydraulic actuation system with feedback control, the method comprising the cyclic repetition of each of the steps of:

determining a current control state of the automatic transmission by said electronic computer system;

computing a target control state for the automatic transmission by said electronic computer system;

calculating a difference between said target control state and said current control state by said electronic computer system;

modifying said difference by said electronic computer system by a factor that is asymptotically decreased as an amount of elapsed control time increases to compensate for a delay in the operation of the hydraulic actuation system relative to operation of the electronic computer system to generate a control signal;

operating said hydraulic actuation system based upon said control signal, wherein all the steps are executed cyclically at a predetermined interval until control is complete.

2. A method according to claim 1, wherein said amount is started decreasing after lapse of a predetermined time from a start of control.

3. A method according to claim 1, further comprising the step of:

modifying said difference based upon a second difference which is determined from comparing said difference at a current cycle with said difference at a first preceding cycle.

4. A method according to claim 3, wherein said difference is further modified so that at least one preceding value of said difference is multiplied by a proportion factor to produce an adjusted difference and said adjusted difference is one of added to and subtracted from said difference.

5. A method according to claim 4, wherein a delay component in modifying said difference is produced using a plurality of preceding modified differences multiplied by respective dividing factors to obtain an asymptotic function of said difference.

6. A method of controlling an automatic transmission in a vehicle using a combination of an electronic computer system and a hydraulic actuation system in a feedback control, the method comprising a cyclic repetition of each of the steps of:

calculating a target value of a control state of the automatic transmission by said electronic computer system;

generating a control signal by said electronic computer system based upon a calculation of a difference between said target value and a current value of said control state and subtraction of a modification value from said difference;

generating said modification value by said electronic computer system based upon said control signal generated in a preceding cycle such that the value of said modification signal is an asymptotically decreasing proportion of a value of said control signal in said preceding cycle that simulates an asymptotic delay of said hydraulic actuation system in a response thereof to said control signal; and operating said hydraulic actuation system in a response thereof to said control signal; and operating said hydraulic actuation system based upon said control signal.

7. A method according to claim 6, wherein said modification value is generated based upon said control signal preceding a current cycle by more than one cycle.

8. A method according to claim 6, wherein said control signal is further modified by an addition thereto of a further modification value based upon a difference between a current value of said difference and a value of said difference in a preceding cycle.

9. A method according to claim 6, wherein said control signal is further modified by a subtraction therefrom of a further modification value based upon a proportional fraction of the value of said control signal in a preceding cycle.

10. A method according to claim 9, wherein said control signal is still further modified by a subtraction therefrom of a still further modification value based upon a proportional fraction of the value of said control signal in a cycle preceding said preceding cycle.

11. A method according to claim 6, wherein said hydraulic actuation system is operated by a signal generated by an integration of said control signal on a basis of a period of the cyclic repetition of said steps.

* * * * *